(12) United States Patent
van de Ven

(10) Patent No.: US 11,255,374 B1
(45) Date of Patent: Feb. 22, 2022

(54) ENGINE CRANK

(71) Applicant: VenTec LLC, Irvine, CA (US)

(72) Inventor: Leon van de Ven, Pretoria East (ZA)

(73) Assignee: VenTec LLC, Irvine, CA (US)

( * ) Notice: Subject to any disclaimer, the term of this patent is extended or adjusted under 35 U.S.C. 154(b) by 0 days.

(21) Appl. No.: 17/192,707

(22) Filed: Mar. 4, 2021

(51) Int. Cl.
*F16C 7/02* (2006.01)
*F02B 75/02* (2006.01)

(52) U.S. Cl.
CPC ............. *F16C 7/023* (2013.01); *F02B 75/02* (2013.01); *F02B 2075/025* (2013.01)

(58) Field of Classification Search
CPC .... F16C 7/023; F16C 3/04; F16C 3/20; F16C 3/22; F02B 75/02; F02B 2075/025; F16F 15/24; F16F 15/28; F16F 15/283
See application file for complete search history.

(56) References Cited

U.S. PATENT DOCUMENTS

| | | | | |
|---|---|---|---|---|
| 2,090,589 | A * | 8/1937 | Burnish | F16F 15/283 74/591 |
| 2,347,521 | A * | 4/1944 | Steiger | F16F 15/24 74/603 |
| 5,285,752 | A * | 2/1994 | Reed | F02B 75/065 123/61 R |
| 7,543,559 | B2 * | 6/2009 | Milicic | F16C 3/04 123/197.1 |
| 7,905,205 | B1 | 3/2011 | Parris | |
| 2012/0137827 | A1 * | 6/2012 | Osawa | F16C 3/20 74/603 |

FOREIGN PATENT DOCUMENTS

| | | | | |
|---|---|---|---|---|
| DE | 4136331 | A1 * | 5/1992 | F16F 15/283 |
| JP | 55023379 | A * | 2/1980 | |
| JP | 2005-140170 | A * | 6/2005 | |

* cited by examiner

*Primary Examiner* — Hung Q Nguyen
(74) *Attorney, Agent, or Firm* — Alonzo & Associates; Arlyn Alonzo

(57) ABSTRACT

Aspects of the disclosure are directed to a crank. In accordance with one aspect, the crank includes a first web, wherein the first web includes a first plurality of protrusions, and wherein one of the first plurality of protrusions includes a first midline radial axis and is non-symmetric with respect to the first midline radial axis; and a second web coupled to the first web, wherein the second web includes a second plurality of protrusions, and wherein one of the second plurality of protrusions includes a second midline radial axis and is non-symmetric with respect to the second midline radial axis.

20 Claims, 10 Drawing Sheets

View 2A

View 2B

View 2C

View 3A

View 3B

View 3C

_(10,255,374 B1)_

ENGINE CRANK

TECHNICAL FIELD

This disclosure relates generally to the field of engine cranks, and, in particular, to engine cranks.

BACKGROUND

Gasoline-powered internal combustion engines are a critical element of the global economy and society. Most automobiles and motorcycles in the world use internal combustion engines of various types and sizes to propel a vehicle along a roadway. Due to the enormous quantity of internal combustion engines, their efficiency in converting the fuel chemical energy to useful mechanical energy is very important and motivates further development in their design.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides an engine crank. Accordingly, a crank, including a first web, wherein the first web includes a first plurality of protrusions, and wherein one of the first plurality of protrusions includes a first midline radial axis and is non-symmetric with respect to the first midline radial axis; and a second web coupled to the first web, wherein the second web includes a second plurality of protrusions, and wherein one of the second plurality of protrusions includes a second midline radial axis and is non-symmetric with respect to the second midline radial axis.

In one example, each of the first plurality of protrusions includes a first left side and a first right side, and the first left side is not symmetric and is not a mirror image of the first right side. In one example, each of the second plurality of protrusions includes a second left side and a second right side, and the second left side is not symmetric and is not a mirror image of the second right side.

In one example, each of the first plurality of protrusions includes a first top side that is arc-shaped. In one example, each of the second plurality of protrusions includes a second top side that is arc-shaped. In one example, the crank further includes a first plurality of horizontal grooves, wherein each of the first plurality of protrusions is adjacent to one of the first plurality of horizontal grooves. In one example, the crank further includes a second plurality of horizontal grooves, wherein each of the second plurality of protrusions is adjacent to one of the second plurality of horizontal grooves.

In one example, the crank further includes a gap between the first web and the second web; and a first plurality of tilting grooves, wherein each of the first plurality of protrusions is adjacent to one of the first plurality of tilting grooves, and wherein each of the first plurality of tilting grooves either tilts downward toward the gap or tilts upward toward the gap. In one example, the crank further includes a second plurality of tilting grooves, wherein each of the second plurality of protrusions is adjacent to one of the second plurality of tilting grooves, and wherein each of the second plurality of tilting grooves either tilts downward toward the gap or tilts upward toward the gap.

In one example, each of the first plurality of protrusions includes a top side that is curved. In one example, each of the second plurality of protrusions includes a second top side that is curved. In one example, the crank further includes a first plurality of horizontal grooves, wherein each of the first plurality of protrusions is adjacent to one of the first plurality of horizontal grooves. In one example, the crank further includes a second plurality of horizontal grooves, wherein each of the second plurality of protrusions is adjacent to one of the second plurality of horizontal grooves.

In one example, the crank further includes a gap between the first web and the second web; and a first plurality of tilting grooves, wherein each of the first plurality of protrusions is adjacent to one of the first plurality of tilting grooves, and wherein each of the first plurality of tilting grooves either tilts downward toward the gap or tilts upward toward the gap. In one example, the crank further includes a second plurality of tilting grooves, wherein each of the second plurality of protrusions is adjacent to one of the second plurality of tilting grooves, and wherein each of the second plurality of tilting grooves either tilts downward toward the gap or tilts upward toward the gap.

Another aspect of the disclosure provides a two-stroke engine, including a piston; a combustion chamber configured to house the piston; a crank, wherein the crank is coupled to the piston; and a crank chamber configured to house the crank; and wherein the crank includes a first web, wherein the first web includes a first plurality of protrusions, and wherein one of the first plurality of protrusions includes a first midline radial axis and is non-symmetric with respect to the first midline radial axis; and a second web coupled to the first web, wherein the second web includes a second plurality of protrusions, and wherein one of the second plurality of protrusions includes a second midline radial axis and is non-symmetric with respect to the second midline radial axis.

In one example, each of the first plurality of protrusions includes a first left side and a first right side, and the first left side is not symmetric and is not a mirror image of the first right side; and wherein each of the second plurality of protrusions includes a second left side and a second right side, and the second left side is not symmetric and is not a mirror image of the second right side.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
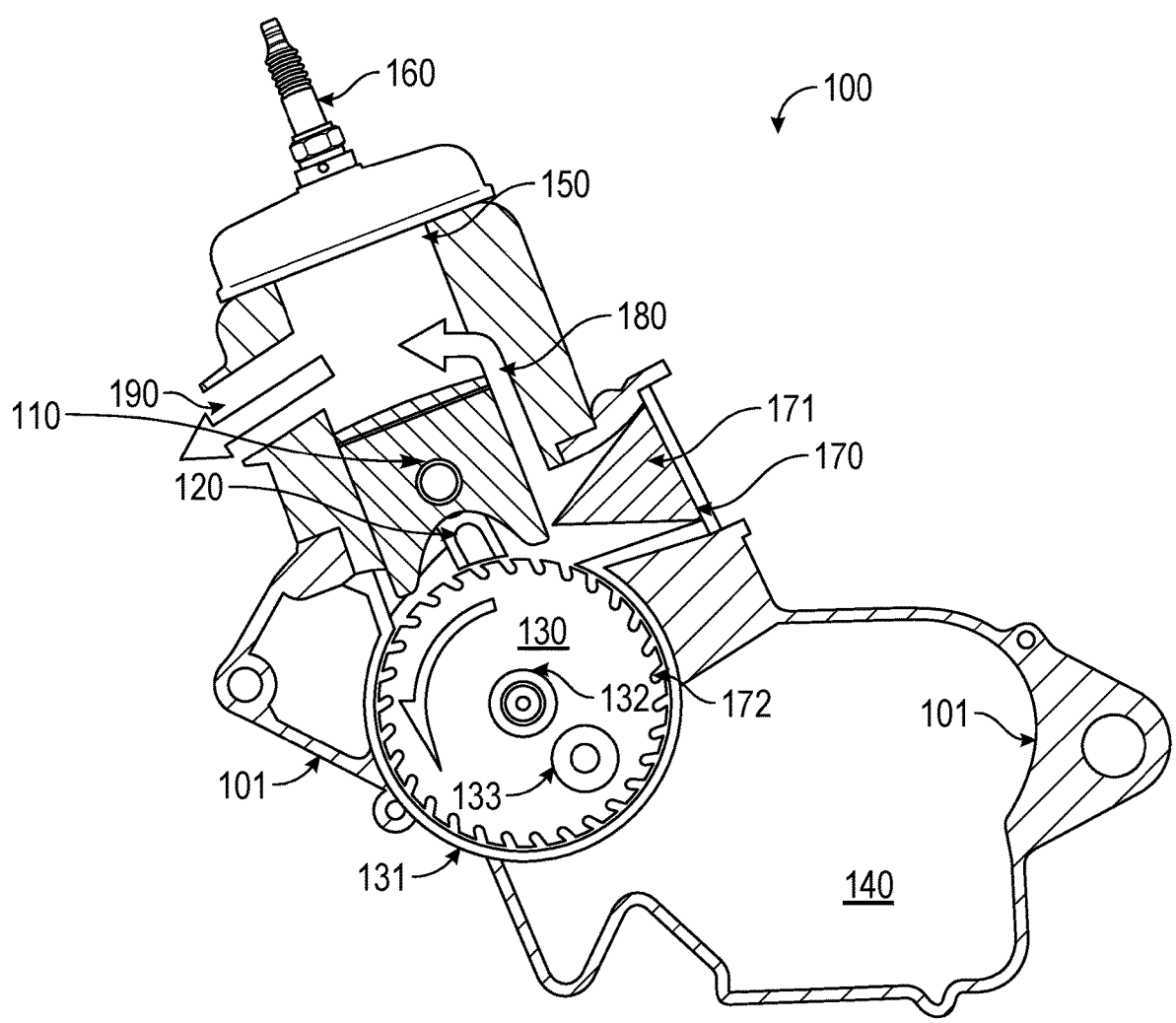
FIG. 1 illustrates an example of a two-stroke engine with a crank in accordance with the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

An internal combustion engine is a heat engine which relies on periodic combustion of a fuel (e.g., gasoline) and air mixture in an enclosed space within the engine to convert stored chemical energy in the fuel to mechanical energy (e.g., linear motion). One classification of an internal combustion engine is the number of strokes (i.e., piston movements) per cycle. For example, a four-stroke engine, used in most automobiles, may include the following four steps: intake, compression, combustion and exhaust. A two-stroke engine, used in many motorcycles and other small equipment, may include two steps in a cycle: a compression stroke and a power stroke. Throughout the cycle, linear motion of a piston within a cylinder is translated into rotational motion of a crank by a connecting rod. In one example, one cycle represents one complete revolution (i.e., 360 degrees) of the crank by the piston.

In one example, the cycle of the two-stroke engine may include the following processes:

1. Compression stroke—cylinder pressure increases as volume of the fuel/air mixture is compressed; piston moves upwards; mixture is ignited by a spark plug to induce combustion
2. Power stroke—cylinder pressure decreases after combustion; piston moves downwards.

For example, through the piston movement during the compression stroke and the power stroke (i.e., one upward movement and one downward movement), the crank rotates one revolution per cycle. In one example, chemical energy is converted to mechanical energy as a result of the combustion. For example, the fuel/air mixture enters the engine through an intake port and exhaust gases from the combustion exit through an exhaust port. In one example, the intake port and the exhaust port are on opposite sides of the engine.

FIG. 1 illustrates an example of a two-stroke engine 100 with a crank in accordance with the present disclosure. In one example, the two-stroke engine 100 may be partially enclosed within an engine casing 101. Within the two-stroke engine 100 are a piston 110, a connecting rod 120 and a crank 130. For example, linear (e.g., vertical) motion of the piston 110 is converted into rotational motion of the crank 130 through the positioning of the connecting rod 120 which connects the piston 110 to the crank 130. The crank 130 may be enclosed within a crank chamber 131. For example, below the crank 130 is a gearbox chamber 140 surrounded by engine casing 101. In one example, air/fuel mixture 171 is introduced into the engine via a reed valve 170. For example, the air/fuel mixture 171 may utilize gasoline as a fuel for a gasoline-powered engine. For example, flow of the air/fuel mixture 171 may be regulated by a carburetor (not shown) or a fuel injector (not shown) prior to introducing the air/fuel mixture 171 via the reed valve 170.

For example, the crank 130 may include a crank axis 132 and a crank pin 133. For example, the crank axis 132 is an axis of rotation for the crank 130. In one example, the crank axis 132 protrudes from the center of the crank. For example, the crank pin 133 is the termination of the connecting rod 120.

In addition, FIG. 1 shows the crank 130 rotating in a counter-clockwise direction around the crank axis 132. For example, the crank rotation propels the air/fuel mixture 171 from the reed valve 170 to the crank chamber 131 and produces a compressed air/fuel mixture 172. In one example, the scooping motion from the crank 130 may further contribute to compressing the air/fuel mixture 171 into the compressed air/fuel mixture 172. For example, the compressed air/fuel mixture 172 is a higher pressure and lower volume version of the air/fuel mixture 171.

In one example, as the crank 130 rotates, the compressed air/fuel mixture 172 traverses an inlet/transfer port 180 and enters a combustion chamber 150 within the engine 100. For example, during the compression stroke, the volume of the compressed fuel/air mixture 172 is compressed further as piston 110 moves upwards. For example, the compressed fuel/air mixture 172 is ignited by a spark plug 160 at the end of the compression stroke to produce combustion products. Next, for example, during the power stroke, energy from the combustion propels the piston 110 downwards and exhaust gases are emitted through an exhaust port 190. In one example, the downward motion of the piston 110 is coupled to the connection rod 120 which drives the rotation of the crank 130.

In one example, the engine 100 converts stored fuel chemical energy to mechanical energy in a two-stroke process using the piston 110, the connecting rod 120 and the crank 130. Performance of the engine may be quantified by performance metrics such as tractive force and power. In one example, tractive force (i.e., lateral force) may be expressed in kilograms (kg), newtons (N) or pounds (lb). In one example, power (i.e., time derivative of work) may be measured in horsepower (hp), watts (W) or joules per sec (J/s).

Figure 2:
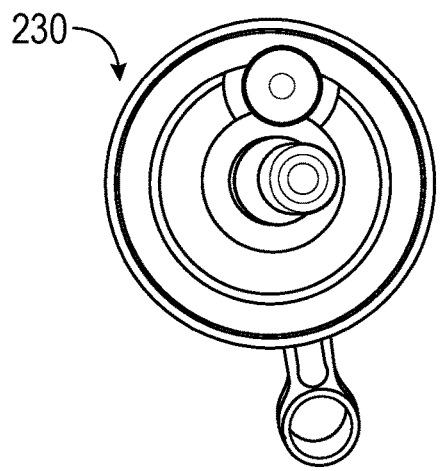
FIG. 2 illustrates three views (view 2A, view 2B, view 2C) of an example crank with smooth radial outer rims.
Figure 2:
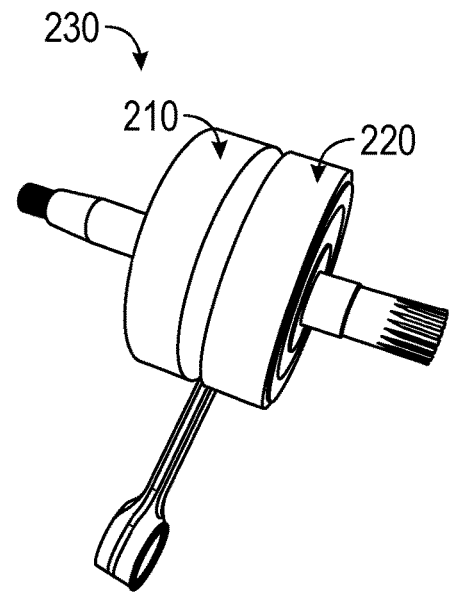
Figure 2:
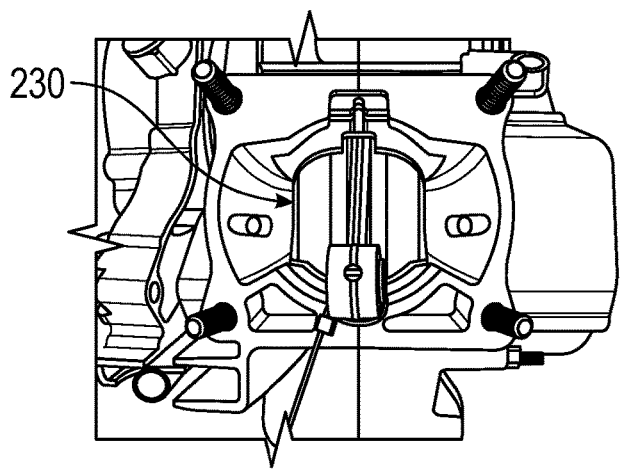

In one example, engine performance may be improved by modification of the crank 130 within the engine 100. FIG. 2 illustrates three views (view 2A, view 2B, view 2C) of an example crank 230 with smooth radial outer rims. In FIG. 2, view 2A is a side view of the crank 230. In FIG. 2, view 2B is a perspective top view of the crank 230. In FIG. 2, view 2C is a bottom view of the crank 230. In one example, the crank 230 may include two half-cranks 210, 220 (as shown in view 2B) with identical rotations and displaced from each other by a gap. In one example, each half-crank is referred to as a web.

Figure 3:
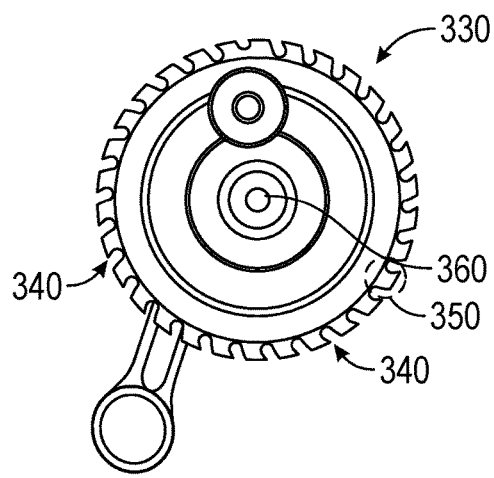
FIG. 3 illustrates three views (view 3A, view 3B, view 3C) of an example crank with non-smooth radial outer rims.
Figure 3:
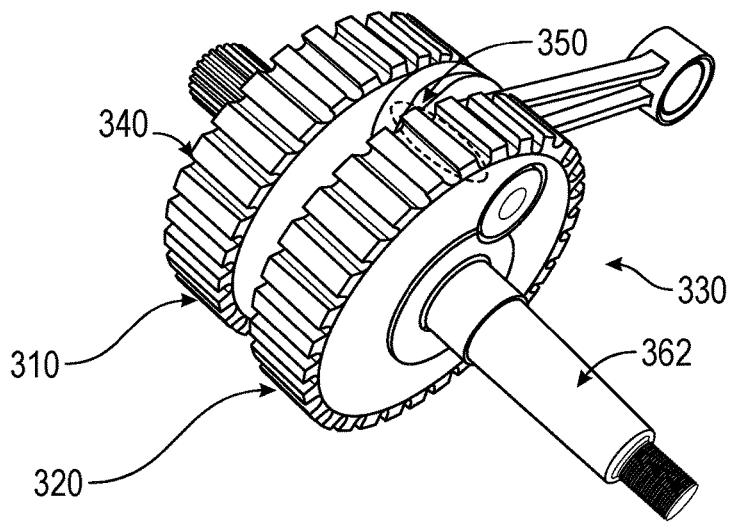
Figure 3:
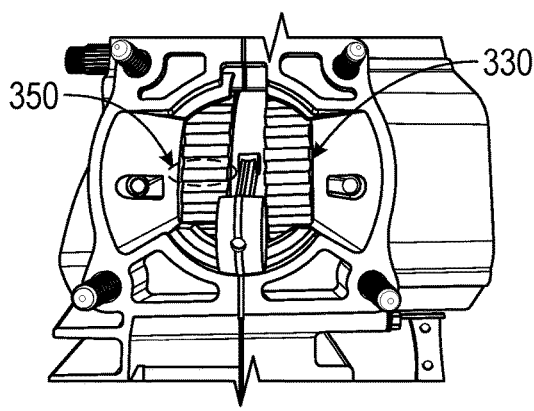

FIG. 3 illustrates three views (view 3A, view 3B, view 3C) of an example crank 330 with non-smooth radial outer rims. In FIG. 3, view 3A is a side view of the crank 330. In FIG. 3, view 3B is a perspective top view of the crank 330. In FIG. 3, view 3C is a bottom view of the crank 330. In one example, the crank 330 may include two half-cranks 310, 320 (as shown in view 3B) with identical rotations and displaced from each other by a gap. In one example, each half-crank is referred to as a web.

In one example, the crank 330 shown in FIG. 3 includes a plurality of protrusions 350 along a crank periphery 340 (i.e., radial outer rim). For example, the plurality of protrusions 350 form a circumferential pattern around the crank 330. In one example, each protrusion 350 may be radially equidistant from a center 360 of the crank 330. For example, radially equidistant means that the outer surface of the protrusion forms a surface of constant radius from the center 360 of the crank 330. In another example, each protrusion 350 may be non-radially equidistant from the center 360 of the crank 330. For example, non-radially equidistant means that the outer surface of the protrusion 330 forms a surface of variable radius from the center 360 of the crank 330. In one example, a crank axis 362 protrudes from the center 360 of the crank 330.

In one example, the plurality of protrusions 350 along the crank periphery 340 improves the performance of a two-stroke engine (e.g., the two-stroke engine 100 shown in FIG. 1). For example, incorporation of the crank 330 with a plurality of protrusions 350 may increase the tractive force and power of the two-stroke engine for a given vehicle speed.

Figure 4:
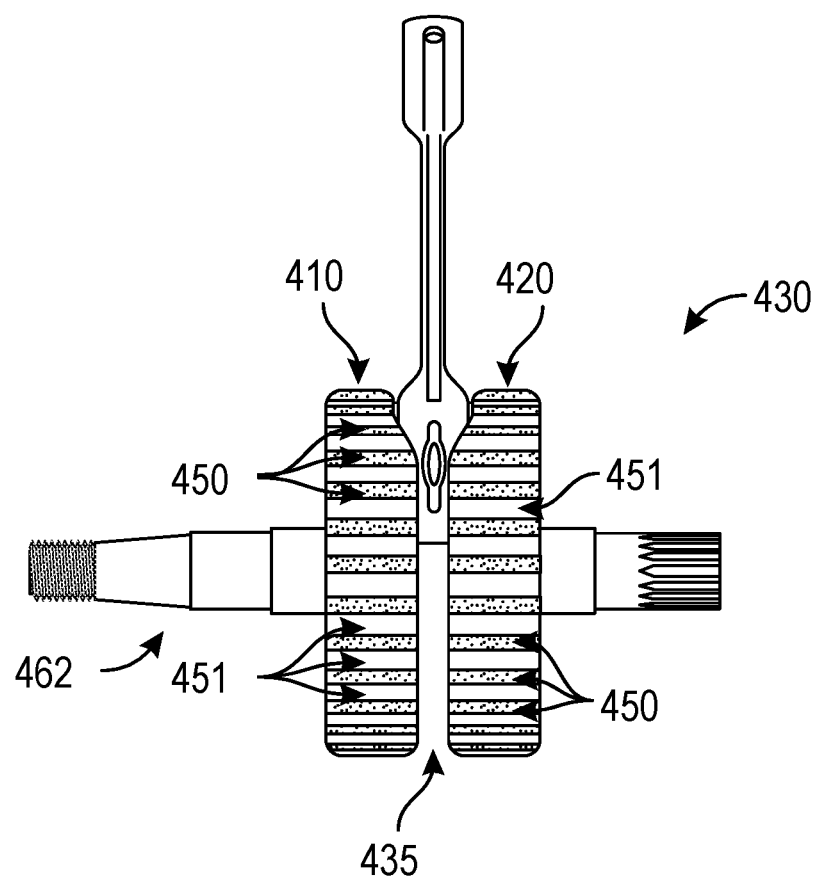
FIG. 4 illustrates an example crank with a plurality of horizontal protrusions and a crank axis.

In one example, the shape of each protrusion may vary among different engine designs. FIG. 4 illustrates an example crank 430 with a plurality of horizontal protrusions 450 and a crank axis 462. From a front view of the crank 430, each of the plurality of horizontal protrusions 450 is adjacent to a horizontal groove 451, such that there is a horizontal groove 451 between each horizontal protrusion 450. For example, the plurality of horizontal protrusions 450 may be radially equidistant. For example, the plurality of horizontal protrusions 450 may be parallel to the crank axis 462. In one example, the crank 430 includes a first web 410, a second web 420 and a gap 435.

Figure 5:
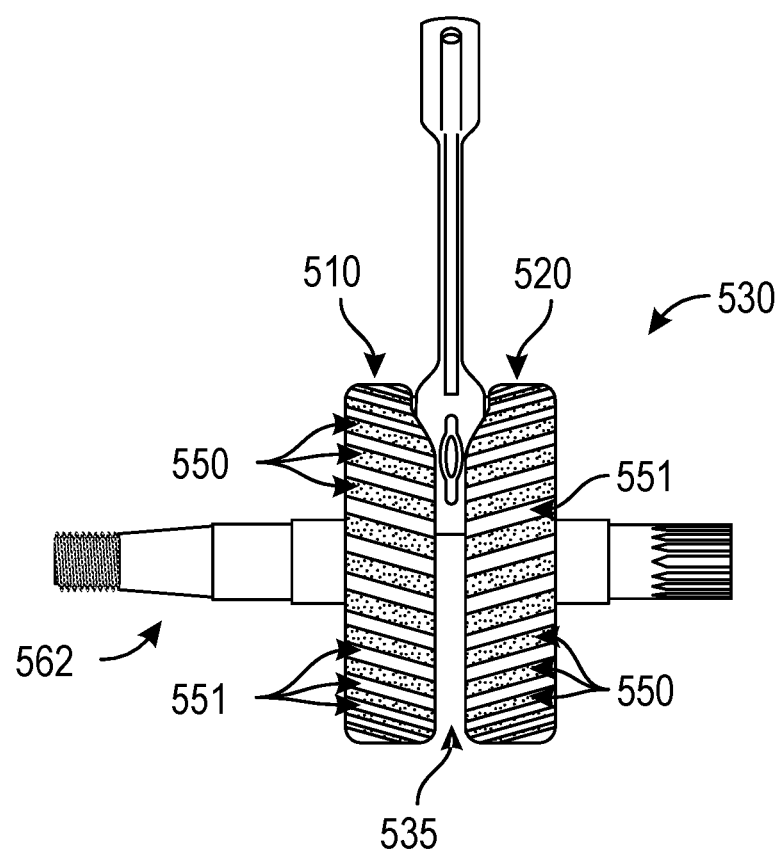
FIG. 5 illustrates an example crank with a plurality of diagonally downward protrusions and a crank axis.

FIG. 5 illustrates an example crank 530 with a plurality of diagonally downward protrusions 550 and a crank axis 562. In one example, the crank 530 includes a first web 510, a second web 520 and a gap 535. From a front view of the crank 530, each of the plurality of diagonally downward protrusions 550 is adjacent to a downward tilting groove 551, such that there is a downward tilting groove 551 between each diagonally downward protrusion 550. From the front view of the crank 530, the downward tilting grooves 551 each tilt downward toward the gap 535. For example, the plurality of diagonally downward protrusions 550 may be radially equidistant.

Figure 6:
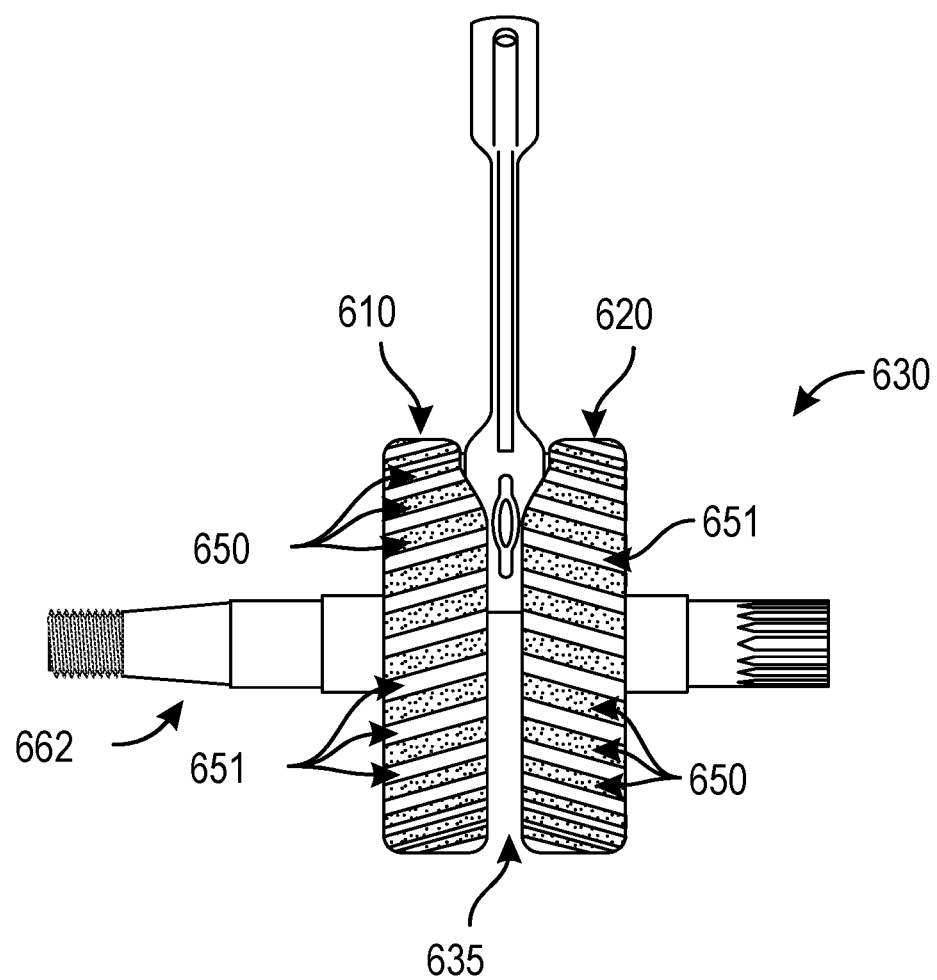
FIG. 6 illustrates an example crank with a plurality of diagonally upward protrusions and a crank axis.

FIG. 6 illustrates an example crank 630 with a plurality of diagonally upward protrusions 650 and a crank axis 662. In one example, the crank 630 includes a first web 610, a second web 620 and a gap 635. From a front view of the crank 630, each of the plurality of diagonally upward protrusions 650 is adjacent to an upward tilting groove 651, such that there is an upward tilting groove 651 between each diagonally upward protrusion 650. From the front view of the crank 630, the upward tilting grooves 651 each tilt upward toward the gap 635. For example, the plurality of diagonally upward protrusions 650 may be radially equidistant.

Figure 7:
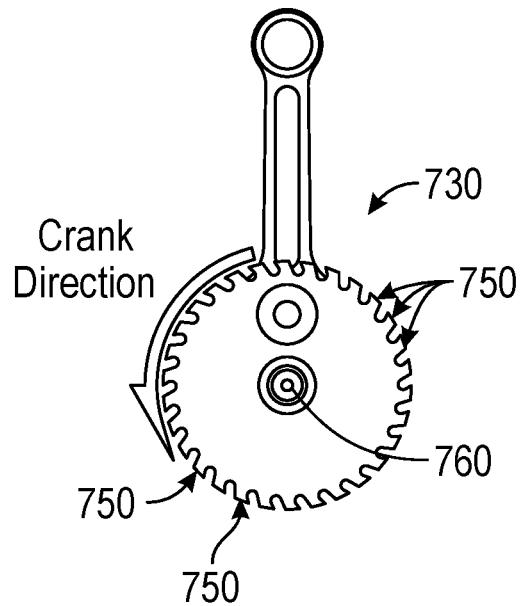
FIG. 7 illustrates a side view of an example crank with a plurality of arc-shaped protrusions.

FIG. 7 illustrates a side view of an example crank 730 with a plurality of arc-shaped protrusions 750. In FIG. 7, the center 760 of the crank 730 is shown. In one example, each arc-shaped protrusion 750 is tilted in a direction towards the rotational direction of the crank 730. In one example, the tilt of each arc-shaped protrusion 750 allows increased scooping of the air/fuel mixture 171 to produce a compressed air/fuel mixture 172. In one example, the tilt of each arc-shaped protrusion 750 allows for compression to occur in the crank chamber 131 in addition to the combustion chamber 150.

Figure 8:
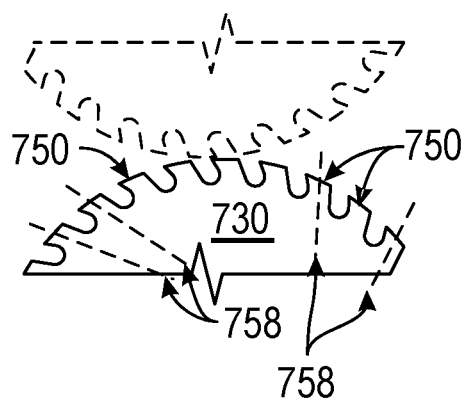
FIG. 8 illustrates a closeup view of the example crank of FIG. 7 with the plurality of arc-shaped protrusions.
Figure 8:
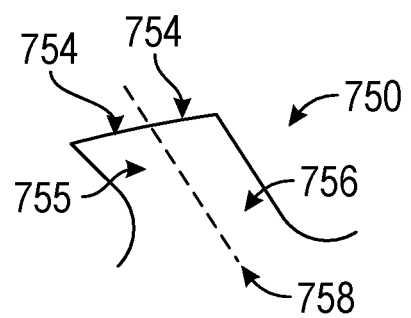

FIG. 8 illustrates a closeup view of the example crank 730 of FIG. 7 with the plurality of arc-shaped protrusions 750. In one example, each arc-shaped protrusion has a top side 754 that is that is arc-shaped. In one example, the arc-shaped top side 754 is at a constant radius from the center 760. In one example, each arc-shaped protrusion is non-symmetric with respect to a midline radial axis 758 of each arc-shaped protrusion. That is, the left side 755 of the arc-shaped protrusion 750 and the right side 756 of the arc-shaped protrusion 750 are not symmetric and not mirror images of each other. In one example, the non-symmetry of the plurality of arc-shaped protrusions 750 increases the scooping of the air/fuel mixture 171 to produce the compressed air/fuel mixture 172.

Figure 9:
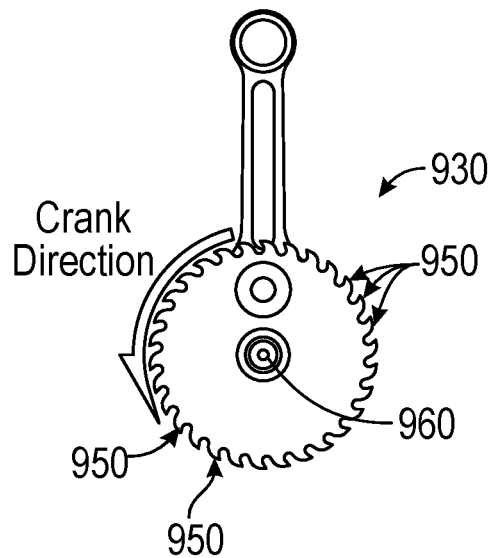
FIG. 9 illustrates a side view of an example crank with a plurality of wavy top protrusions.

FIG. 9 illustrates a side view of an example crank 930 with a plurality of wavy top protrusions 950. In FIG. 9, the center 960 of the crank 730 is shown. In one example, each wavy top protrusion 950 is tilted in a direction towards the rotational direction of the crank 930. In one example, the tilt of each wavy top protrusion 950 allows increased scooping of the air/fuel mixture 171 to produce a compressed air/fuel mixture 172. In one example, the tilt of each wavy top protrusion 950 allows for compression to occur in the crank chamber 131 in addition to the combustion chamber 150.

Figure 10:
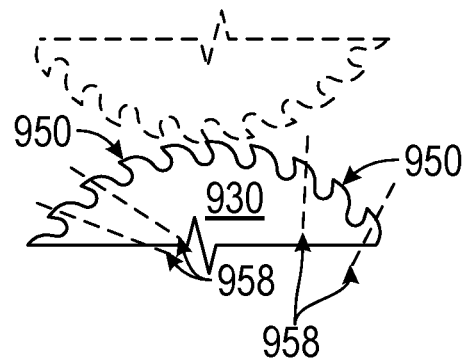
FIG. 10 illustrates a closeup view of the example crank of FIG. 9 with the plurality of wavy top protrusions.
Figure 10:
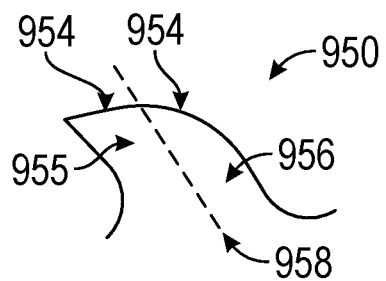

FIG. 10 illustrates a closeup view of the example crank 930 of FIG. 9 with the plurality of wavy top protrusions 950. In one example, each wavy top protrusion has a top side 954 that is substantially curved (i.e., curved). In one example, each wavy top protrusion 950 is non-symmetric with respect to a midline radial axis 958 of each wavy top protrusion 950. That is, the left side 955 of the wavy top protrusion 950 and the right side 956 of the wavy top protrusion 950 are not symmetric and not mirror images of each other. In one example, the non-symmetry of the plurality of wave protrusions increases the scooping of the air/fuel mixture 171 to produce the compressed air/fuel mixture 172.

In one aspect, the crank examples shown in FIGS. 3 through 10 may operate with a two-stroke engine. In another aspect, the quantity of strokes for the engine in which the crank can operate is not limited to two strokes. Thus, one skilled in the art would understand that the crank examples disclosed in the present disclosure may operate in engines with other stroke quantities within the scope and spirit of the present disclosure.

Figure 11:
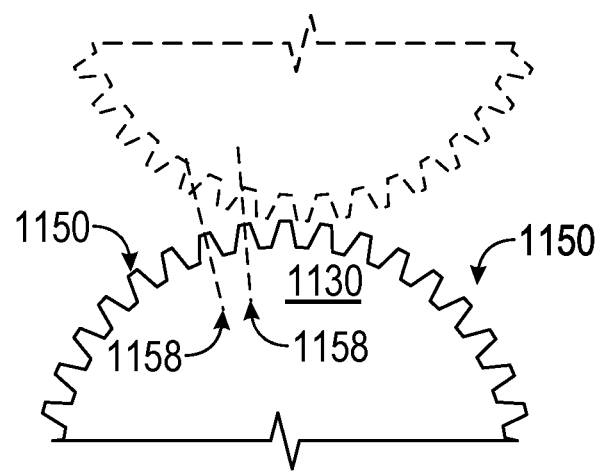
FIG. 11 a side view of an example crank with a plurality of symmetric protrusions.
Figure 11:
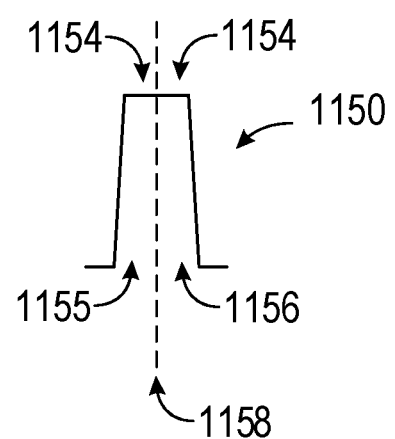

FIG. 11 a side view of an example crank 1130 with a plurality of symmetric protrusions 1150. The symmetric protrusion 1150 does not tilt in either a direction towards or a direction away from the rotational direction of the crank 1130. In one example, each symmetric protrusion 1150 has a top side 1154.

In one example, each symmetric protrusion 1150 is symmetric with respect to a midline radial axis 1158 of each symmetric protrusion 1150. That is, the left side 1155 of the symmetric protrusion 1150 and the right side 1156 of the symmetric protrusion 1150 are symmetric and mirror images of each other. In one example, the symmetry of the symmetric protrusions 1150 does not significantly increase the scooping of the air/fuel mixture 171 to produce the compressed air/fuel mixture 172. In one example, the lack of tilt of each symmetric protrusion 1150 does not allows for compression to occur in the crank chamber 131.

Figure 12:
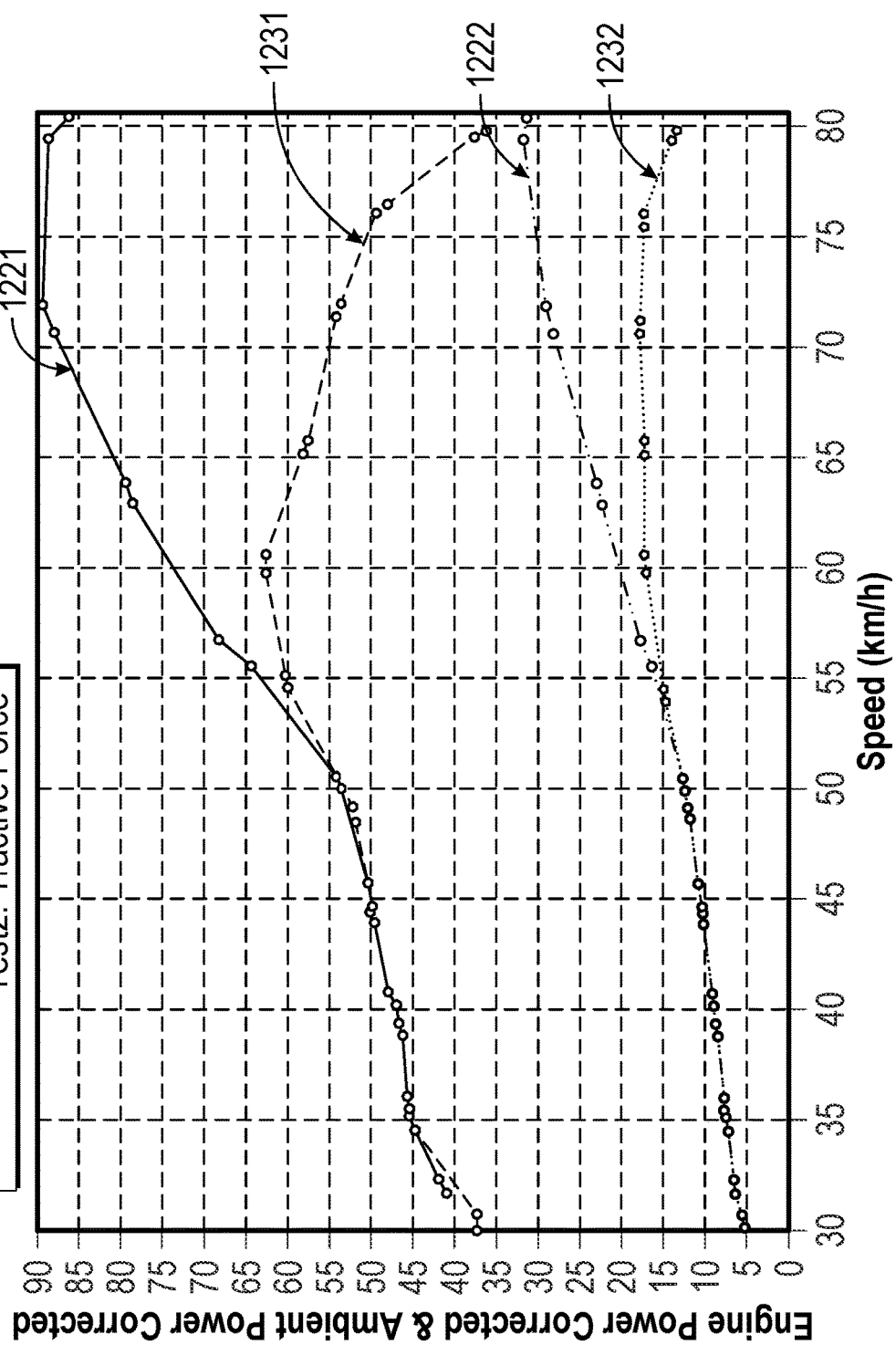
FIG. 12 illustrates an example engine performance graph as a function of vehicle speed.

FIG. 12 illustrates an example engine performance graph 1200 as a function of vehicle speed. For example, a first graph line 1221 shows tractive force (kg) vs. vehicle speed for an engine with a crank with a plurality of arc-shaped protrusions (similar to the arc-shaped protrusions 750 shown in FIG. 7). For example, a second graph line 1222 shows power (hp) vs. vehicle speed for the engine with the crank with a plurality of arc-shaped protrusions (similar to the arc-shaped protrusions 750 shown in FIG. 7).

For example, a third graph line 1231 shows tractive force (kg) vs. vehicle speed for an engine with a crank with smooth radial outer rims (similar to the crank 230 shown in FIG. 2). For example, a fourth graph line 1232 shows power (hp) vs. vehicle speed for the engine with the crank with smooth radial outer rims (similar to the crank 230 shown in FIG. 2).

In one example, these graph lines 1221, 1222 show the improved performance attainable with the crank with a plurality of arc-shaped protrusions (similar to the arc-shaped protrusions 750 shown in FIG. 7). For example, tractive force is measured as 91 kg at 72 km/h for the crank with a plurality of arc-shaped protrusions (similar to the arc-shaped protrusions 750 shown in FIG. 7) and as 63 kg at 60 km/h for the crank with smooth radial outer rims (similar to the crank 230 shown in FIG. 2). For example, power is measured as 32 hp at 80 km/h for the crank with a plurality of arc-shaped protrusions (similar to the arc-shaped protrusions 750 shown in FIG. 7) and as 17 hp at 72 km/h for the crank with smooth radial outer rims (similar to the crank 230 shown in FIG. 2).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A crank, comprising:
   a first web, wherein the first web includes a first plurality of protrusions, and wherein one of the first plurality of protrusions includes a first midline radial axis and is non-symmetric with respect to the first midline radial axis; and
   a second web coupled to the first web, wherein the second web includes a second plurality of protrusions, and wherein one of the second plurality of protrusions includes a second midline radial axis and is non-symmetric with respect to the second midline radial axis.

2. The crank of claim 1, wherein each of the first plurality of protrusions includes a first left side and a first right side, and the first left side is not symmetric and is not a mirror image of the first right side.

3. The crank of claim 2, wherein each of the second plurality of protrusions includes a second left side and a second right side, and the second left side is not symmetric and is not a mirror image of the second right side.

4. The crank of claim 3, wherein each of the first plurality of protrusions includes a first top side that is arc-shaped.

5. The crank of claim 4, wherein each of the second plurality of protrusions includes a second top side that is arc-shaped.

6. The crank of claim 5, further comprising a first plurality of horizontal grooves, wherein each of the first plurality of protrusions is adjacent to one of the first plurality of horizontal grooves.

7. The crank of claim 6, further comprising a second plurality of horizontal grooves, wherein each of the second plurality of protrusions is adjacent to one of the second plurality of horizontal grooves.

8. The crank of claim 5, further comprising:
   a gap between the first web and the second web; and
   a first plurality of tilting grooves, wherein each of the first plurality of protrusions is adjacent to one of the first plurality of tilting grooves, and wherein each of the first plurality of tilting grooves either tilts downward toward the gap or tilts upward toward the gap.

9. The crank of claim 8, further comprising a second plurality of tilting grooves, wherein each of the second plurality of protrusions is adjacent to one of the second plurality of tilting grooves, and wherein each of the second plurality of tilting grooves either tilts downward toward the gap or tilts upward toward the gap.

10. The crank of claim 3, wherein each of the first plurality of protrusions includes a top side that is curved.

11. The crank of claim 10, wherein each of the second plurality of protrusions includes a second top side that is curved.

12. The crank of claim 11, further comprising a first plurality of horizontal grooves, wherein each of the first plurality of protrusions is adjacent to one of the first plurality of horizontal grooves.

13. The crank of claim 12, further comprising a second plurality of horizontal grooves, wherein each of the second plurality of protrusions is adjacent to one of the second plurality of horizontal grooves.

14. The crank of claim 11, further comprising:
a gap between the first web and the second web; and
a first plurality of tilting grooves, wherein each of the first plurality of protrusions is adjacent to one of the first plurality of tilting grooves, and wherein each of the first plurality of tilting grooves either tilts downward toward the gap or tilts upward toward the gap.

15. The crank of claim 14, further comprising a second plurality of tilting grooves, wherein each of the second plurality of protrusions is adjacent to one of the second plurality of tilting grooves, and wherein each of the second plurality of tilting grooves either tilts downward toward the gap or tilts upward toward the gap.

16. A two-stroke engine, comprising:
a piston;
a combustion chamber configured to house the piston;
a crank, wherein the crank is coupled to the piston; and
a crank chamber configured to house the crank; and wherein the crank comprises:
a first web, wherein the first web includes a first plurality of protrusions, and wherein one of the first plurality of protrusions includes a first midline radial axis and is non-symmetric with respect to the first midline radial axis; and
a second web coupled to the first web, wherein the second web includes a second plurality of protrusions, and wherein one of the second plurality of protrusions includes a second midline radial axis and is non-symmetric with respect to the second midline radial axis.

17. The two-stroke engine of claim 16, wherein each of the first plurality of protrusions includes a first left side and a first right side, and the first left side is not symmetric and is not a mirror image of the first right side; and wherein each of the second plurality of protrusions includes a second left side and a second right side, and the second left side is not symmetric and is not a mirror image of the second right side.

18. The two-stroke engine of claim 17, wherein each of the first plurality of protrusions includes a first top side that is arc-shaped and each of the second plurality of protrusions includes a second top side that is arc-shaped.

19. The two-stroke engine of claim 18, further comprising:
a first plurality of grooves, wherein each of the first plurality of protrusions is adjacent to one of the first plurality of grooves; and
a second plurality of grooves, wherein each of the second plurality of protrusions is adjacent to one of the second plurality of grooves.

20. The two-stroke engine of claim 17, wherein each of the first plurality of protrusions includes a first top side that is curved and each of the second plurality of protrusions includes a second top side that is curved.

* * * * *